United States Patent
Banerjee et al.

(10) Patent No.: US 10,145,469 B2
(45) Date of Patent: Dec. 4, 2018

(54) METHOD FOR PARAMETERIZING GEARSHIFTS AND FOR CARRYING OUT GEARSHIFTS

(71) Applicant: ZF Friedrichshafen AG, Friedrichshafen (DE)

(72) Inventors: Alexander Banerjee, Oberteuringen (DE); Martin Sperlich, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 200 days.

(21) Appl. No.: 15/223,252

(22) Filed: Jul. 29, 2016

(65) Prior Publication Data
US 2017/0037958 A1    Feb. 9, 2017

(30) Foreign Application Priority Data
Aug. 3, 2015 (DE) ..................... 10 2015 214 736

(51) Int. Cl.
*F16H 63/40* (2006.01)
*F16H 61/02* (2006.01)

(52) U.S. Cl.
CPC ......... *F16H 61/0213* (2013.01); *F16H 63/40* (2013.01); *B60Y 2200/148* (2013.01);
(Continued)

(58) Field of Classification Search
None
See application file for complete search history.

(56) References Cited

U.S. PATENT DOCUMENTS

| 7,390,284 B2 | 6/2008 | Wheals |
| 9,043,074 B2 * | 5/2015 | Sodergren ......... B60W 40/1005 701/30.2 |

(Continued)

FOREIGN PATENT DOCUMENTS

| DE | 102 96 801 T5 | 4/2004 |
| DE | 10 2005 001 506 A1 | 7/2006 |

OTHER PUBLICATIONS

Joachim Carsten, "Optimierung des Schaltprozesses bei schweren Nutzfahrzeugen durch adaptive Momentenführung", Renningen, Expert-Verlag, Dec. 31, 2010.

(Continued)

*Primary Examiner* — Dirk Wright
(74) *Attorney, Agent, or Firm* — Davis & Bujold PLLC; Michael J. Bujold

(57) ABSTRACT

A method of parameterization of traction force interrupted shifts in a transmission of a commercial vehicle having a frame, a cab supported by the frame, and a trailer coupled to the frame. The method includes a mathematical model which considers movement equations and geometrical parameters of the frame, the cab, and the trailer. Traction force patterns of traction force interrupted shifts are predetermined which depend on a traction force decrease time, a shift time, and a traction force increase time. From model and force patterns, vibration behaviors of the cab as the output parameter of the model is simulated. The parameterization of traction force interrupted shiftings takes place such that, as the shifting parameters, the traction force decrease time, the shift time, and the traction force increase time of such force patterns are determined, for which a defined evaluation criterion of the simulated vibration behavior of the cab is optimal.

11 Claims, 3 Drawing Sheets

(52) U.S. Cl.
CPC ..... *B60Y 2300/188* (2013.01); *B60Y 2300/28* (2013.01); *F16H 2061/0227* (2013.01)

(56) References Cited

U.S. PATENT DOCUMENTS

| | | | |
|---|---|---|---|
| 9,050,952 B2* | 6/2015 | Groger | B60W 10/06 |
| 9,352,747 B2* | 5/2016 | Nagatsuka | G01S 19/13 |
| 9,399,464 B2* | 7/2016 | Kunihiro | B62D 15/025 |
| 9,429,443 B2* | 8/2016 | Hoch | G01C 21/3469 |
| 2012/0109470 A1* | 5/2012 | Amtsfeld | B60C 23/0408 |
| | | | 701/48 |
| 2015/0175140 A1* | 6/2015 | Shimizu | B60T 8/171 |
| | | | 701/70 |

OTHER PUBLICATIONS

D Schramm et al., "Modellbilding and Simulation der Dynamkk von Kraftfahrzeugen", 2 Auflage, Berlin, Heidelberg, Springer Vieweg, 2013.

Lena Webersinke, "Adaptive Antriebsstrangregelung für die Optimierung des Fahrverhaltens von Nutzfahrzeugen", Karlsruhe: Universitätsverlag Karlsruhe, Dec. 18, 2008.

German Search Report Corresponding to 10 2015 214 736.3 dated Nov. 12, 2015.

* cited by examiner

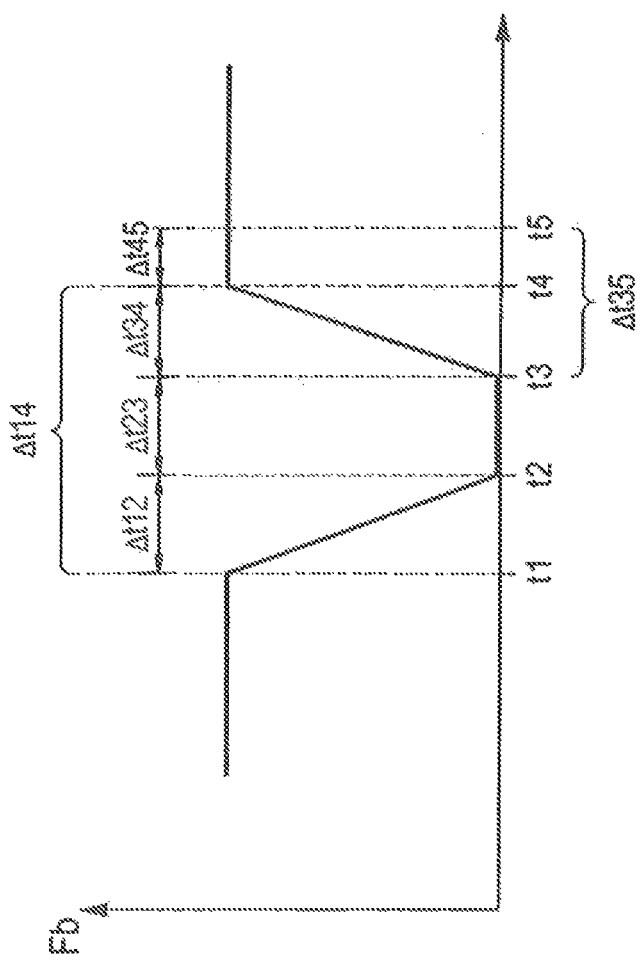

METHOD FOR PARAMETERIZING GEARSHIFTS AND FOR CARRYING OUT GEARSHIFTS

This application claims priority from German patent application serial no. 10 2015 214 736.3 filed Aug. 3, 2015.

FIELD OF THE INVENTION

The invention concerns a method for the parameterizing of traction force interrupted gear shifts in a transmission of a commercial vehicle, which has a vehicle frame, a driver's cab which is supported on the vehicle frame, and a trailer which is coupled with the vehicle frame. In addition, the invention concerns a method for implementing traction force interrupted gear shifts in such a transmission, as well as a control device for implementing the method.

BACKGROUND OF THE INVENTION

A commercial vehicle has a vehicle frame, which connects with the road through wheels. A driver's cab is supported on the vehicle frame via spring damping systems with allow relative movement of the driver's cabin reference to the vehicle frame. A follower is coupled with the vehicle frame, and is also known as a trailer, and connects with the road through wheels.

When executing traction force interrupted gear shifts in a transmission of such a commercial vehicle, the driver's cab is excited so as to vibrate. If the traction force is initially reduced when implementing traction force interrupted shifting, the driver's cab moves towards the front in reference to the vehicle frame whereas, during the implementation of a traction force interrupted shift, when the traction force is again increased, the driver's cab moves toward the back in reference to the vehicle frame. Hereby, the driver's cab is subject to oscillating pitching movement whereby, due to such pitching movements, the driver's cab is pushed towards limiting stops and can strike the stops, which limit the pitching movement of the driver's cab. The pitching movement is rotation about the transverse axis of the driver's cab.

Movements of the driver's cab with respect to the vehicle frame are perceived as uncomfortable, especially when the driver's cab hits the limiting stop which causes shocks to the driver's cab.

Such pitching movement or rather oscillation of the driver's cab with respect to the vehicle frame is in particular dependent on the design of the suspension of the driver's cab at the vehicle frame.

In relatively soft suspensions of the driver's cab, traction force interrupted shiftings are highly noticeable with regard to the pitching movement of the driver's cab while, in contrast, with stiff suspensions, traction force interrupted shifting has lesser influence on pitching movement of the driver's cab.

However, relatively stiff driver's cab suspensions are generally uncomfortable.

To counter the problem of pitching movements of the driver's cab relative to the vehicle frame, constructive steps had been proposed in the state-of-the-art to reduce pitching movement of the driver's cab relative to the vehicle frame. Hereby, special damping systems and damping absorbers are proposed, which dampen pitching oscillations of the driver's cab relative to the vehicle frame.

Known from the publication DE 10 2005 001 506 A1 is a method for increasing driver comfort in a commercial vehicle where, at the time of a load reduction during the initiation of a shift, damping between the vehicle frame and front axle is controlled such that the position of the vehicle frame is substantially maintained.

On this basis, the objective of the invention is to create novel methods for parameterizing traction force interrupted gear shifts and for implementation the shifts, as well as a control device for implementing the method.

SUMMARY OF THE INVENTION

This object is achieved with a method for parameterizing traction force interrupted gear shifts.

In accordance with the invention, the method comprises the following steps:

a mathematical model of the commercial vehicle, which takes movement equations and geometric parameters of the vehicle frame, driver cab, and trailer into consideration, depending on traction force gradients of traction force interrupted shiftings are given for a traction force reduction timing, for a shift time, and traction force increase timing whereby, on the basis of that model and the traction force patterns, the vibration pattern of the driver's cab is simulated; the parameterization of the traction force shifts takes place in such a way that the traction force decrease time, the shift time, and the traction force increase time for such traction force patterns are determined as shifting parameters, for which defined criterion for the simulated vibration behavior is optimal.

It is proposed with the invention to determine, for the reduction of vibration of a driver's cab of a commercial vehicle with respect to its vehicle frame, which can occur during the implementation of a shift, the shift parameters, namely the traction force reduction time, the shift time, and the traction force increase time. The determination of these shifting parameters takes place on the basis of a mathematical model which, depending on predetermined traction force patterns in which the traction force reduction time, the shift time, and the traction force increase time are varied, simulates the vibration behavior of the driver's cab. The simulated vibration behavior is analyzed by means of an analyzing tool, whereby such traction force patterns which, on the basis of such traction force patterns lead to an optimal vibration pattern, are used for the determination of the vibration parameters.

Preferably, the model for the commercial vehicle takes, as degrees of freedom for the vehicle frame, longitudinal movement, vertical movement, and pitching movement into consideration, and as degrees of freedom for the driver's cab, vertical movement and pitching movement, a link between the vehicle frame and the driver's cab through a trailing arm, and a link between the vehicle frame and the trailer through a fifth-wheel coupling. Such a model in particular allows advantageous simulation of the pitching vibration behavior with respect to the vehicle frame and in particular advantageous evaluation.

In an advantageous further embodiment of the invention, the vibration pattern of the pitching movement of the driver's cab is simulated, whereby preferably as criterion, the amplitude of the vibration pattern of the driver's cab is used, in particular in such a way that, as shifting parameters, the traction force decrease time, the shifting time, and the traction force increase time are determined of such traction force patterns, for which the amplitude of the vibration pattern of the driver's cab is minimal. That allows an especially advantageous evaluation of the vibration pattern of the driver's cab while determining optimal shifting parameters.

The method of implementing a traction force interrupted shift. The shifting parameters for traction force interrupted shiftings, as determined in the above manner, are used for the implementation of the traction force interrupted shifts.

The invention concerns, in addition, a control device for the implementation of the inventive method. The control device comprises parts which serve for the implementation of the invented method. These parts are hardware based parts and software tools. The hardware based parts include data interfaces to exchange data with the assemblies which are involved with implementing the invented method. The hardware based part can for instance be a processor for the data processing and a memory for the data storage. The software based parts are program modules for implementing the inventive method.

BRIEF DESCRIPTION OF THE DRAWINGS

Preferred further embodiments result from the following description. Embodiment examples of the invention are, without being limited here, explained further based on the drawings. These show:

FIG. 3 a timing diagram of a predetermined traction force pattern.

DETAILED DESCRIPTION OF THE PREFERRED EMBODIMENTS

The invention concerns a method for the parameterization of traction force interrupted shiftings in a transmission of a commercial vehicle, whereby the commercial vehicle has a vehicle frame, a driver's cab which is supported at the vehicle frame, and a trailer which is linked to the vehicle frame. In addition, the invention concerns a method for the implementation of traction force interrupted shiftings.

Figure 1:
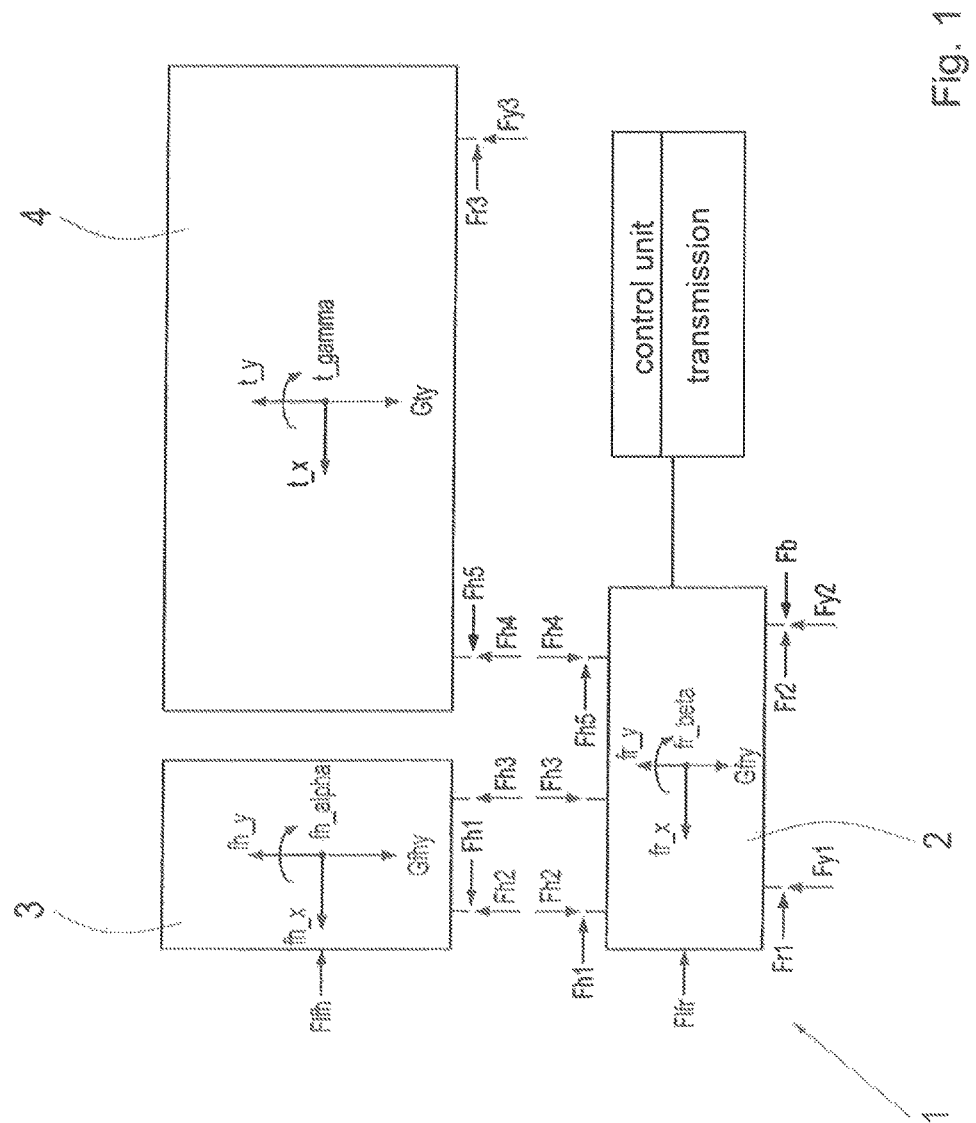
FIG. 1 a schematic illustration of a commercial vehicle with forces, torques, near movements, and pitching movements of the commercial vehicle.
Figure 2:
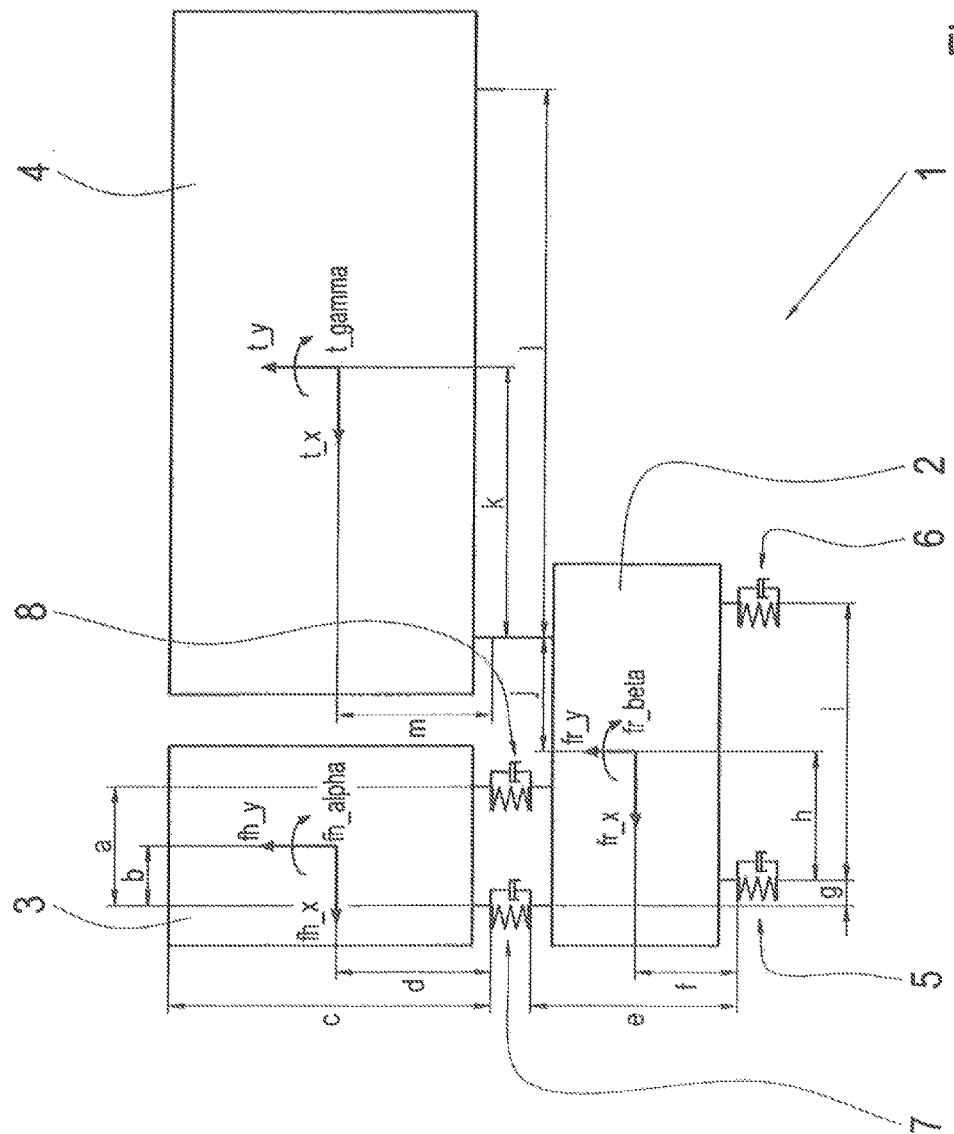
FIG. 2 a schematic illustration of the commercial vehicle with geometric dimensions, linear movements, and pitching movements of the commercial vehicle.

FIGS. 1 and 2 show, heavily schematized, a commercial vehicle 1, which has a vehicle frame 2, a driver's cab 3 which is supported at the vehicle frame 2, and a trailer 4 which is coupled to the vehicle frame 2. The vehicle frame 2 is also abbreviated as fr, the driver's cab 3 as fh, and the trailer 4 as t.

For parameterization of traction force interrupted shiftings in such a commercial vehicle 1, simulations are performed by means of a mathematical model of the commercial vehicle 1, which takes into account the movement equations and geometric parameters of the vehicle frame 2 or rather fr, the driver's cab 3 or rather fh, and the trailer 4 or rather t, wherein the simulations use the input values of predetermined traction force patterns of traction force interrupted shiftings, which are dependent on a traction force decrease time of the traction force interrupted shifting, a shift timing of the traction force interrupted shifting, and a traction force increase time of the traction force interrupted shifting. The traction force reduction period corresponds to a clutch disengagement time of a disengaging clutch. The traction force increase time corresponds to a clutch engagement time of an engaging clutch.

As an initial value in this simulation, the vibration behavior of the driver's cab 3 or fh, respectively, is calculated, in particular its pitch vibration behavior. Pitching is rotational movement around a transverse axis of the driver's cab. The simulation, namely the simulated vibration behavior of the driver's cab 3 or fh, respectively, is hereafter evaluated with a defined evaluation criterion whereby, for the parameterization of traction force interrupted shiftings, the traction force decrease time, the shifting time, and the traction force increase time of such traction force patterns are determined as shifting parameters, for which the defined evaluation criterion is optimally met.

Thus and by means of mathematical models, the pitching vibration behavior or the pitching movement, respectively, of the driver's cab 3 or fh, respectively, is simulated based on the predetermined traction force patterns, in which the traction force increase time, the shift time, and the traction force decrease time are varied, whereby this simulated vibration behavior is evaluated to determine optimal shifting parameters for the traction force interrupted shifts.

The model of the commercial vehicle 1 considers for the vehicle frame 2 or fr, respectively, as degrees of freedom, longitudinal movement in the x-direction, vertical movement in the y-direction and pitching movement, whereby the pitching angle is labeled as beta.

The model of the commercial vehicle considers also, as degrees of freedom, for the driver's cab 3 or fh, respectively, vertical movement in the y-direction and a pitching movement, whereby the pitching angle of the driver's cab 3 or fh, respectively, is labeled as alpha.

Also, the model of the commercial vehicle 1 takes into account a link between the vehicle frame 2 or fr, respectively, and the driver's cab 3 or fh, respectively, through a trailing arm, whereby this link between the vehicle frame 2 or fr, respectively, and the driver's cab 3 or fh, respectively, is presented in FIG. 2 as two spring damper systems 7, 8, namely as a forward spring damper 7 and a rear spring damper system 8.

In addition, the model of the commercial vehicle takes into account a link between the vehicle frame 2 or fr, respectively, and the trailer 4 or t, respectively, through a fifth-wheel coupling. No spring damper system is installed between the vehicle frame 2 or fr, respectively, and the trailer 4 or T, respectively.

It can also be learned from FIG. 2 that the link of the vehicle frame 2 or fr in reference to a road is simulated by an additional spring damper systems 5, 6, namely in the area of a front wheel by the spring damper system 5, and in the area of a rear wheel by a spring damper system 6. The wheels of the trailer 4 are viewed without spring damper systems.

FIG. 1 visualizes for the model of the commercial vehicle 1, the impacting forces F at the vehicle frame 2 or fr, respectively, at the driver's cab 3 or fh, respectively, and the trailer 4 or t, respectively, as well as the weight forces G, longitudinal movements in the x-direction, vertical movements in the y-direction and pitching movements, whereby the pitching angle for the driver's cab 3 or fh, respectively, is labeled as alpha, the vehicle frame 2 or fr, respectively, as beta, and the trailer 4 or t with gamma.

FIG. 2 also shows geometric constants of the model of the commercial vehicle 1, here for instance the constant i is an axle spacing between the front axle and the rear axle of the vehicle frame 2 or fr, respectively, the constant h is a distance of the center of gravity of the vehicle frame 2 or fr, respectively, in the x-direction or longitudinal direction, respectively, from the front axle of the vehicle frame 2 or fr, respectively, the constant f is a distance of the center of gravity of the vehicle frame 2 or fr, respectively, in the y-direction or vertical direction, respectively, from the front axle of the vehicle frame 2 or fr, respectively, the constant e is the height of the vehicle frame 2 or fr, respectively, the constant c is the height of the driver's cab 3 or fh, respectively, the constant d is a distance of the center of gravity of the driver's cab 3 or fr, respectively, from the spring damper systems 7, 8 in the y-direction or vertical direction, respectively, the constant b is a distance of the center of gravity of the driver's cab 3 in the x-direction or longitudinal direction, respectively, from the front spring damper system 7, the constant a is the distance between the two spring damper systems 7, 8 in the x-direction or longitudinal direction, respectively, and the constant l is a distance of the linkage point of the trailer 4 or t, respectively, with the vehicle frame 2 or fr, respectively, to the rear axle of the trailer 4 or t, respectively, in the x-direction or longitudinal direction, respectively, the constant k is a distance of the center of gravity of the trailer 4 or t, respectively, in the x-direction or longitudinal direction from the linking point of the trailer at the vehicle frame 2. The constant j corresponds to the distance of the center of gravity of the vehicle frame or fr, respectively, from the linkage point of the trailer 4 and the vehicle frame 2 in the x-direction or longitudinal direction, respectively, whereby the constant m represents the height of the center of gravity of the trailer 4 or t, respectively. The constant g corresponds to the distance, in the x-direction or longitudinal direction, respectively, between the front spring damper system 7, which is positioned between the driver's cab and the vehicle frame, and the spring damper system 5 of the front axle of the vehicle frame 2 or fr, respectively.

Taking into consideration the forces shown in FIG. 1 and FIG. 2, the linear and rotational directions of movement as well as geometric constants, the following equation system of equations (1) to (12) can be established as the model for the commercial vehicle 1, whereby the equations (1) to (9) represent movement equations, and the equations (10) to (12) geometric parameters. whereby fh_alpha is the pitching movement of the driver's cab 3 or fh, respectively, $$Flfh + mfh*gE*\sin(rho) + mfh*fh\_xpp = Fh1 \quad (1)$$

$$mfh*fh\_ypp + mfh*ge*\cos(rho) = Fh2 + fh3 \quad (2)$$

$$Jfh*fh\_alphapp = Fh1*d + Fh2*b - Fh3*(a-b) \quad (3)$$

$$Fh1 + Fh5 + Flfr + Fr1 + Fr2 + mfr*fr\_xpp + mfr*ge*\sin(rho) = Fb \quad (4)$$

$$Fh2 + Fh3 + Fh4 + mfr*fr\_ypp + mfr*ge*\cos(rho) = Fy1 + Fy2 \quad (5)$$

$$Jfr*fr\_betapp = Fy1*h + Fh1(e-f) + Fh5*(e-f) + Fh4*j + Fb*f \ldots -Fy2*(i-h) - Fr1*f - Fr2*f - Fh3*(h+g-a) - Fh2*(h+g) \quad (6)$$

$$Fh5 = mt*t\_xpp + mt*ge*\sin(rho) + Fr3 \quad (7)$$

$$mt*t\_ypp + mt*ge*\cos(rho) = Fy3 + Fh4 \quad (8)$$

$$Jt*t\_gammapp = Fh4*l + Fh5*m - Fr3*m - Fy3*(k-l) \quad (9)$$

$$fh\_x = fr\_x + h + g - ((h+g) - (h+g)*\cos(fr\_beta)) - b - (b - b*\cos(fh\_alpha)) \quad (10)$$

$$t\_x = fr\_x - j - l + (j - j*\cos(fr\_beta)) - (l - l*\cos(t\_gamma)) \quad (11)$$

$$t\_y = fr\_y + (e-f) + m - j*\sin(fr\_beta) + (k-l)*\sin(t\_gamma) \quad (12)$$

whereby fr_beta is the pitching movement of the vehicle frame 2 or fr, respectively, whereby t_gamma is the pitching movement of the trailer 4 or t, respectively, whereby fh_x is the longitudinal movement of the driver's cab 3 or fh, respectively, whereby fr_x is the longitudinal movement of the vehicle frame 3 or fr, respectively, whereby t_x is a longitudinal movement of the trailer 4 or t, respectively, whereby fh_y is the vertical movement of the driver's cab 3 or fr, respectively, whereby fry is the vertical movement of the vehicle frame 2 or fh, respectively, whereby t_y is the vertical movement of the trailer 4 or t, respectively, whereby pp are time derivatives of the above values, whereby mfh is the mass of the driver's cab 3 or fh, respectively, whereby mfr is the mass of the vehicle frame 2 or fr, respectively, whereby mt is the mass of the trailer 4 or t, respectively, whereby Jfh is the mass inertia of the driver's cab 3 or fh, respectively, whereby Jfr is the mass inertia of the vehicle frame 3 or fr, respectively, whereby Jt is the mass inertia of the trailer 4 or t, respectively, whereby rho is the road inclination, whereby Fb is the predetermined traction force pattern, whereby Flfh, Flfr are air resistance forces, whereby Fr1, Fr2, and Fr3 are rolling resistance forces, whereby Fy1, Fy2, and Fy3, are spring/damper forces, whereby Fh1, Fh4, and Fh5 are constraint forces, whereby a, b, c, d, e, f, g, h, i, j, k, l, m are geometric parameters of the commercial vehicle, and whereby ge is the acceleration due to gravity. The determination of the driving resistance, comprising of the air resistance forces Flfh, Flfr, and the rolling resistance forces Fr1, Fr2, and Fr3, as well as the forces Fy1, Fy2, and Fy3 takes place based on known analytical correlations or by means of measuring characteristic curves.

As already mentioned, this same traction force patterns Fb are predetermined for the simulation for the pitching variation movements beta of the driver's cab 2 or fh through this equation system as input parameters, in which a traction force decrease time, the shift time, and the traction force increase time are varied.

FIG. 3 shows here a typical pattern of the traction force Fb over the time during the implementation of a traction force interrupted shift whereby the traction force decrease time is defined through the time t1 and t2, wherein the shift time is determined by time t2 and t3, and wherein the traction force increase time is determined by time t3 and t4. The time interval Δt14 between the times t1 and t4, therefore, define the total duration of the traction force interrupted shift. The time interval Δt12 corresponds to the traction force decrease time, and the time interval Δt23 to the shift time, and the time interval Δt34 to the traction force increase time. As already presented, several traction force patterns Fb are predetermined for the simulation of the vibration pattern through the mentioned equations system, whereby the above times for the traction force increase time, the shift time, and the traction force decrease time, are varied to simulate in this way, with different traction force patterns, the vibration behavior of the driver's cab 3 or fh, respectively.

This simulated vibration behavior, preferably the simulated pitching vibration behavior, of the driver's cab is thereafter evaluated with a defined evaluation criterion, whereby the selected criterion is preferably the amplitude of the vibration behavior of the driver's cab 3 or fh, and the evaluation takes place in such a way that the traction force patterns are optimal for the vibration behavior of the driver's cab 3 or fh, where the maximum amplitude of the vibration behavior of the driver's cab is minimal. A vibration behavior which meets this evaluation criterion is based on an optimal traction force pattern Fd which is optimal in regard to the traction force decrease time, shift time, and traction force increase time for the allocation of a vibration behavior with a minimal maximum amplitude.

In addition to the traction force increase time, shift time, and traction force decrease time, the pattern of the traction force increase and of the traction force decrease can be varied and be determined as a parameter for traction force interrupted shiftings through the simulation and evaluation.

The evaluation can hereby happen over the entire shift duration Δt14. However, it is preferably provided that the above evaluation takes place during the time interval Δt35 which is shown in FIG. 3, whereby the time interval Δt35 is the sum of the time intervals Δt34 and Δt45. The time interval Δt34 corresponds to the traction force increase time, the time interval Δt45 relates to a defined time interval after the completion of the traction force increase, in which the traction force Fb is constant.

For different operating conditions of the commercial vehicle, here for instance for different loadings of the driver's cab 3, as well as the trailer 4 and/or for different road inclinations rho, based on the above described parameterization, optimal parameter sets for traction force interrupted shiftings can be determined and stored in a control device, namely a transmission control device.

Dependent on the actual operating condition, here for instance dependent on the actual road inclination rho, the actual weight of the trailer 4 and/or the actual weight of the driver's cab 3, the respective shifting parameters are then selected to perform a traction force interrupted shift. It is herewith finally possible to increase the drive comfort because the vibration behavior of the driver's cab 3 of the commercial vehicle 1 is affected by the optimal shifting parameters.

If for a defined operating situation, based on the above equation systems and the above simulation, several optimal shifting patterns or shifting parameters, respectively, are present, the parameters sets which are applied guarantee the shortest possible shifting interval, Δt14 at the shortest possible shift time Δt23 and shortest possible traction force decrease time Δt34.

Typically, the shift time and the traction force decrease time are selected through the invented method for the parameterization of traction force interrupted shiftings in a way so that, during the shift time, exclusively spring restoring forces affect the driver's cab and that, during the traction force decrease time, the traction force increase is elevated in phase with a reverse vibration of the driver's cab, so that here the driver's cab does not experience vibration excitations. In particular, the traction force increase takes place in a way where the traction force increase is completed and the respective clutch is engaged, where forces which affect the driver's cab, namely inertia force and spring force, are in balance or almost in balance, respectively. That results in a damping and an optimized vibration behavior of the driver's cab.

The above model can be expanded to also simulate the rolling vibration behavior of the driver's cab, and to take them into account during the parameterization of traction force interrupted shiftings. The rolling is a rotational movement around a longitudinal axis of the driver's cab.

REFERENCE CHARACTERS

1 Commercial Vehicle
2 Vehicle Frame fr
3 Driver's cab fh
4 Trailer t
5 Spring Damping System Front Wheel
6 Spring Damping System Rear Wheel
7 Spring Damping System Front
8 Spring Damping System Rear

The invention claimed is:

1. A method of parameterization and implementation of a traction force interrupted shift in a transmission of a commercial vehicle, the transmission having a control device and the vehicle having a vehicle frame, a driver's cab which is supported by the vehicle frame, and a trailer which is linked with the vehicle frame, the method comprising:
  providing the control device with a mathematical model of the commercial vehicle which takes into account movement equations and geometrical parameters of the vehicle frame, the driver's cab, and the trailer;
  determining, with the control device, traction force patterns of the traction force interrupted shift which depend on a variety of traction force decrease times, shift times, and traction force increase times;
  simulating, with the control device, vibration behavior of the driver's cab relative to the vehicle frame based on the mathematical model and the traction force patterns;
  selecting, with the control device, the traction force pattern having shifting parameters of the traction force decrease time, the shift time, and the traction force increase time which are optimal for a defined evaluation criterion of the simulated vibration behavior of the driver's cab relative to the vehicle frame; and
  implementing in the transmission, via the control device, the traction force interrupted shift of the vehicle based on the shifting parameters of the selected traction force pattern so as to minimize vibration of the cab relative to the vehicle frame.

2. The method according to claim 1, further comprising considering, with the mathematical model of the commercial vehicle for the vehicle frame, a longitudinal movement, a vertical movement, and a pitching movement as degrees of freedom, the mathematical model of the commercial vehicle takes the vertical movement and the pitching movement into consideration as degrees of freedom for the driver's cab, the mathematical model of the commercial vehicle takes into consideration a link between the vehicle frame and the driver's cab through a trailing arm, and the mathematical model of the commercial vehicle takes into consideration a link between the vehicle frame and the trailer via a fifth-wheel coupling.

3. The method according to claim 1, further comprising simulating the vibration behavior of a pitching movement of the driver's cab.

4. The method according to claim 1, further comprising considering an amplitude of the simulated vibration behavior of the driver's cab as an evaluation criterion.

5. The method according to claim 4, further comprising determining the traction force decrease time, the shift time, and the traction force increase time of the traction force patterns for the shifting parameters, for which the amplitude of the simulated vibration behavior of the driver's cab is minimal.

6. The method according to claim 4, further comprising evaluating the amplitude at least during the traction force increase time.

7. The method according to claim 6, further comprising evaluating the amplitude, in addition, during a defined time interval after completion of the traction force increase.

8. The method according to claim 4, further comprising considering, in the mathematical model of the commercial vehicle, a plurality of movement equations and geometrical parameters of the vehicle frame, the driver's cab, and the trailer, and the movement equations and the geometrical parameters comprising:

$$Flfh+mfh*gE*\sin(rho)+mfh*fh\_xpp=Fh1 \quad (1)$$

$$mfh*fh\_ypp+mfh*ge*\cos(rho)=Fh2+fh3 \quad (2)$$

$$Jfh*fh\_alphapp=Fh1*d+Fh2*b-Fh3*(a-b) \quad (3)$$

$$Fh1+Fh5+Flfr+Fr1+Fr2+mfr*fr\_xpp+mfr*ge*\sin(rho)=Fb \quad (4)$$

$$Fh2+Fh3+Fh4+mfr*fr\_ypp+mfr*ge*\cos(rho)=Fy1+Fy2 \quad (5)$$

$$Jfr*fr\_betapp=Fy1*h+Fh1(e-f)+Fh5*(e-f)+Fh4*j+Fb*f \ldots -Fy2*(i-h)-Fr1*f-Fr2*f-Fh3*(h+g-a)-Fh2*(h+g) \quad (6)$$

$$Fh5=mt*t\_xpp+mt*ge*\sin(rho)+Fr3 \quad (7)$$

$$mt*t\_ypp+mt*ge*\cos(rho)=Fy3+Fh4 \quad (8)$$

$$Jt*t\_gammapp=Fh4*l+Fh5*m-Fr3*m-Fy3*(k-l) \quad (9)$$

$$fh\_x=fr\_x+h+g-((h+g)-(h+g)*\cos(fr\_beta))-b-(b*\cos(fh\_alpha)) \quad (10)$$

$$t\_x=fr\_x-j-l+(j-j*\cos(fr\_beta))-(l-l*\cos(t\_gamma)) \quad (11)$$

$$t\_y=fr\_y+(e-f)+m-j*\sin(fr\_beta)+(k-l)*\sin(t\_gamma) \quad (12)$$

wherein fh_alpha is a simulated pitching movement of the driver's cab, wherein Fb is the predetermined traction force pattern, wherein Flfh, Flfr are air resistance forces, wherein Fr1, Fr2, and Fr3 are roll resistance forces, wherein Fy1, Fy2, and Fy3 are spring/damper forces, wherein Fh1, Fh4, and Fh5 are constraint forces, wherein pp are time derivatives, wherein rho is road inclination, wherein mfh, mfr, mt are masses of the vehicle frame, the driver's cab, and the trailer, wherein Jfh, Jfr, Jt are mass inertias of the vehicle frame, the driver's cab, and the trailer, wherein a, b, c, d, e, f, g, h, i, j, k, l, m are geometric dimensions, and wherein ge is acceleration due to gravity.

9. The method according to claim 1, further comprising applying the traction force decrease time, the shift time and the traction force increase time as the shifting parameters which are determined according to the method.

10. A device for a transmission of a commercial vehicle, the device comprising: a control unit for implementing a method for parameterization and implementation of traction force interrupted shifts in the transmission of the commercial vehicle having a vehicle frame, a driver's cab which is supported by the vehicle frame, and a trailer which is linked with the vehicle frame, the method including, providing the control unit with a mathematical model of the commercial vehicle which takes into account movement equations and geometrical parameters of the vehicle frame, the driver's cab, and the trailer, determining, with the device, traction force patterns of the traction force interrupted shift which depend on a variety of traction force decrease times, shift times, and traction force increase times simulating, with control unit, vibration behavior of the driver's cab relative to the vehicle frame based on the mathematical model and the traction force patterns, selecting, with the control unit, the traction force pattern having the shifting parameters of the traction force decrease time, the shift time, and the traction force increase time which are optimal for a defined evaluation criterion of the simulated vibration behavior and implementing in the transmission, via the control unit, the traction force interrupted shift of the vehicle based on the shifting parameters of the selected traction force pattern so as to minimize vibration of the cab relative to the vehicle frame.

11. A method implementing a traction force interrupted shift in a transmission of a commercial vehicle using selected shifting parameters, the commercial vehicle having a vehicle frame which supports a driver's cab and is linked to a trailer, the transmission having a control device, the method comprising:
  defining a traction force pattern for a traction force interrupted shift as having shift parameters including a traction force decrease time, a shift time, and a traction force increase time;
  providing the control device with a plurality of the traction force patterns comprising a variety of shift parameters, the shift parameters comprising traction force decrease times, shift times, and traction force increase times;
  providing the control device with a mathematical model comprising movement equations, which consider movement of the vehicle frame, the driver's cab and the trailer, and geometric parameters of the vehicle frame, the driver's cab and the trailer;
  simulating, with the control device, vibration behaviors of the driver's cab based on the mathematical model and the plurality of traction force patterns;
  analyzing, with the control device, the simulated vibration behaviors of the driver's cab and determining the traction force pattern having the shift parameters which produce a minimal maximum amplitude of the simulated vibration behavior of the driver's cab; and
  implementing in the transmission, with the control device, a traction force interrupted shift in the transmission of the commercial vehicle applying the shift parameters of the traction force pattern determined to produce the minimal maximum amplitude of the simulated vibration behavior of the driver's cab.

* * * * *